United States Patent
Ashikawa et al.

(10) Patent No.: US 6,407,887 B1
(45) Date of Patent: Jun. 18, 2002

(54) MAGNETIC TAPE CASSETTE HAVING A LID LOCK

(75) Inventors: Teruo Ashikawa; Katsuki Asano, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/581,750

(22) PCT Filed: Dec. 17, 1998

(86) PCT No.: PCT/JP98/05722
§ 371 (c)(1),
(2), (4) Date: Aug. 17, 2000

(87) PCT Pub. No.: WO99/33054
PCT Pub. Date: Jul. 1, 1999

(30) Foreign Application Priority Data

Dec. 19, 1997 (JP) .............................................. 9-351518

(51) Int. Cl.⁷ .............................................. G11B 23/02
(52) U.S. Cl. ...................................................... 360/132
(58) Field of Search ......................... 360/132; 242/347, 242/347.1, 347.2

(56) References Cited

U.S. PATENT DOCUMENTS 5,084,799 A * 1/1992 Moo Yeol et al. .......... 360/132
5,222,686 A    6/1993 Komeiji et al. ............. 242/199
5,717,554 A * 2/1998 Sawada ...................... 360/132
5,796,563 A * 8/1998 Iwano et al. ................ 360/132

FOREIGN PATENT DOCUMENTS

| EP | 0 169 544 | 1/1984 | ......... G11B/23/087 |
| EP | 0 129 844 | 1/1985 | ............ G11B/23/04 |
| EP | 0 179 169 | 4/1986 | ......... G11B/23/087 |
| EP | 0 189 989 | 8/1986 | ......... G11B/23/087 |
| EP | 0 384 786 | 8/1990 | ......... G11B/23/087 |
| EP | 0 488 599 | 6/1992 | ......... G11B/23/087 |

* cited by examiner

Primary Examiner—David Davis
(74) Attorney, Agent, or Firm—Sughrue Mion, PLLC

(57) ABSTRACT

The hook 2a of a lid lock 2 is urged by a spring 48 so that an outer lid 41 integral with the lid lock pawl 45 is locked closed. At that time, the hook 2a is abutted against the side surface of a lid lock pawl 45 which formed in the side board of an outer lid 41. In the case where an impact is applied to the magnetic tape cassette, the impact force is absorbed by the side surface of the lid lock pawl 45 and the lid lock 2. At that time, an arcuate surface 2b confronting with the end portion of the lid lockpawl 45 prevents the end portion 45a of the lid lock pawl 45 from being collapsed or rolled up. Accordingly, the occurrence of troubles such as the deterioration in function of the lock mechanism, and the biting of the magnetic tape is prevented.

2 Claims, 3 Drawing Sheets

MAGNETIC TAPE CASSETTE HAVING A LID LOCK

TECHNICAL FIELD

This invention relates to a magnetic tape cassette, and more particularly to the lock mechanism of the lid which, when the magnetic tape cassette is loaded in a device such as a VTR (video tape recorder), is opened to pull out the magnetic tape, and is closed when the cassette is not in use.

BACKGROUND ART

As is well known in the art, a variety of magnetic tape cassettes are used for video devices such as video decks. Among those cassettes, a relatively small one is for instance a digital video cassette (DVC).

Now, an example of a magnetic tape cassette known as a DVC will be described with reference to FIGS. 3 and 4. First, the construction of a conventional magnetic tape cassette will be described with reference to FIG. 3. In a lower half case (hereinafter referred to as "a lower half", when applicable) 31, a pair of reels 32a and 32b are rotatably arranged, and a magnetic tape (not shown) is wound on those reels 32a and 32b. The magnetic tape is guided by right and left tape guides 33a and 33b which are provided at the front end of the cassette, thus passing through an opening 34 formed in the front end of the lower half 31. The peripheries of the reels 32a and 32b (the peripheries of the lower flanges) have teeth 35a and 35b, respectively.

On the other hand, in order to eliminate the difficulty that, when the magnetic tape cassette is not loaded in the video deck (not shown); i.e., when the cassette is carried or stored, the magnetic tape is loosen; in a space at the rear side of the cassette which is formed between the reels 32a and 32b, a brake member 38 and a compression spring (or a brake spring) 39 are arranged. The brake member 38 has locking pawls 37a and 37b forming a lock device which is to lock the rotation of the reels 32a and 32b. The compression spring 39 urges the brake member 38.

On the other hand, the upper half case (hereinafter referred to as "an upper half", when applicable) 40 has an outer lid 41 to cover the front opening of the lower half 31, an upper lid 42, and an inner lid 43. Those lids are provided in such a manner that they are freely opened and closed.

Lid lock pawls 45 are protruded from the inner surfaces of both side boards 44 of the outer lid 41. And frame-shaped accommodating sections 51 are provided inside of the right and left side boards 46. The frame-shaped accommodating sections 51 have functions for mounting swingably lid locks 47 which are locked to the lid lock pawls 45 of the outer lid 41. Behind each of the accommodating sections 51, a spring 48 is provided which is to urge the lid lock 47 to be locked. The provision of the spring 48 is achieved by coupling the ring which is formed at the end of the spring 48 to a locking pin 52.

The accommodating sections 51 are symmetrical in structure and the lid locks 47 are also symmetrical in its accommodation state, and therefore the left half of FIG. 3 shows a state of explosion, while the right half shows the state of accommodation. In FIG. 3, for simplification in description, those other than essential components are not designated by reference characters, and are not described.

Now, the lock arrangement and function to freely open and close the outer lid 41 will be described with reference to FIG. 4. FIG. 4 is a side view of the front part of the magnetic tape cassette; more specifically, FIG. 4 is a side view, with parts cut away, to clearly show the structure and function of the lid lock pawl 45, the lid lock 47, and parts concerning the latter 45 and 47.

As shown in FIG. 3, the position of formation of the lid lock pawl is shown on the inner surface of the side board 44 forming the outer lid 41. Its configuration is such that, as shown in FIG. 4, it is vertically long, and its lower end portion is tapered. On the other hand, a pair of shafts 53 are provided on both sides of the lid lock 47. The shafts 53 are placed on recess-shaped shaft receiving sections 54 which are formed in both walls of the accommodating section 51, so that the lid lock 47 is swingably supported. The top of the lid lock 47 has a locking groove 55, to which one end of the spring 49 is locked. In the locking groove 55, a protrusion 55a is formed on the right side of the shaft 53. As the spring 48 is engaged with the protrusion 55a, the lid lock 47 is kept urged clockwise.

In the above-described magnetic tape cassette 30, when it is not loaded in a video deck or the like, the lid lock 47 is urged clockwise. Hence, the lid lock pawl 45 is locked by a hook 47a, so that the outer lid 41 integral with the lid lock pawl 45 is not opened.

On the other hand, when the magnetic tape cassette 30 is loaded in a video deck of the like, a reacting section 47b is urged in the direction of the arrow A, so that the whole lid lock 47 is swung counterclockwise about the shaft 53. That is, the whole lid lock 47 is swung from the position indicated by the solid line to the position indicated by the phantom line, so that the locking of the lid lock pawl 45 and the hook 47a of the lid lock 47 is released.

As a result, the outer lid 41 is swung clockwise about the fulcrum pin 63, thus swinging while pushing the upper lid 42 thereby to open the front 34 of the magnetic tape cassette 30. Owing to the urging force of the outer lid 41, the upper lid 42 is moved backwardly while being guided by the guide grooves 54 formed in both side surfaces, so that the magnetic tape can be pulled out towards the front 34.

The above-described magnetic tape cassette 30 has a variety of problems as described below: That is, since the lower portion of the lid lock pawl 45 is tapered, for instance when the magnetic tape cassette is dropped, the lid lock pawl may be deformed if a shock is applied to the end portion which is abutted against the hook 47a of the lid lock 47. For instance, owing to the impact force attributing to the dropping of the magnetic tape cassette, the end of the lick lock pawl 45 is strongly abutted against the side surface of the lid lock, thus being deformed, collapsed or rolled up. Owing to this deformation, the lid lock pawl 45 is pushed upwardly, so that the lid 41 is pushed upwardly as a whole, thus playing with respect to the hook 47a. That is, the lid is not satisfactorily closed.

Sometimes, the locking force is decreased, so that the lid is unintentionally opened. Owing to the impact attributing to the dropping of the magnetic tape cassette, the magnetic tape is slackened so that its part comes out of the lid 41 thus opened. In this case, when the lid 41 is closed, the magnetic tape is bitten thereby. This trouble is serious.

Japanese Utility Model Unexamined Publication No. Sho. 62-229583 has disclosed an example of a tape cassette in which the lid lock is engaged with the side surface of the lid lock pawl, thereby to prevent the lid from being unintentionally opened, and, in order that the end of the lid lock pawl is suitably disengaged from the lid lock when unlocked, the engaging section of the lid lock is inclined at a suitable angle, and a gap is formed between the lid lock pawl and the lid lock.

However, the effect of the tape cassette disclosed by the Japanese Utility Model Unexamined Publication No. Sho. 62-229583 cannot be obtained unless the lid pawl is formed with an accurate angle of inclination. On the other hand, the lid lock of a DVC or the like is a small component. Hence, in the case where the technical concept of the Japanese Utility Model Unexamined Publication No. Sho. 62-229583 is applied to the lid lock of a DVC or the like, its dimensions must be controlled with extremely high accuracy when molded.

DISCLOSURE OF THE INVENTION

In view of the foregoing, an object of the invention is to provide a magnetic tape cassette which is advantageous as follows: Even when the magnetic tape cassette is dropped, or an impact is applied onto it, the lid is prevented from being unintentionally opened, and when the lid is opened, the magnetic tape is prevented from being bitten thereby. Furthermore, for this purpose, the cassette can be molded with ease.

The foregoing object of the invention has been achieved by the provision of a magnetic tape cassette comprising:

upper and lower half casings;

a pair of reels rotatably accommodated in the upper and lower half casings;

a magnetic tape wound on the pair of reels, a lid which closes an opening formed in one end of the upper and lower half casings, and is opened when the magnetic tape is pulled out, a lid lock pawl provided at one end of the lid; and a lid lock locked to the lid lock pawl and swingably mounted on one end of the upper and lower half casings, wherein the lid lock includes a hook which is locked abutting against the side surface of the lid lock pawl, and a reacting section which is energized when the magnetic tape is pulled out, the lid lock is urged by an elastic element so that the hook is locked to the side surface of the lid lock pawl, and unlocked from the lid lock pawl by the energization of the reacting section, and the lid lock is provided with an arcuate surface which is located at a basal portion of the hook and confronted with the end of the lid lock pawl.

In the above-mentioned magnetic tape cassette, it is preferrable that a gap is defined between the end and the arcuate surface.

In the case where an impact is applied to the magnetic tape cassette for instance when the latter is dropped, the impact force is absorbed by the side surface of the lid lock pawl and the lid lock. Since the end portion of the lid lock pawl is confronted with the arcuate surface of the lid lock, no force is applied to the end portion thereof. Namely, the end portion is not deformed, not collapsed and not rolled up. Accordingly, the lid is prevented from unsatisfactorily closed.

BEST MODE FOR CARRYING OUT THE PRESENT INVENTION

Figure 1:
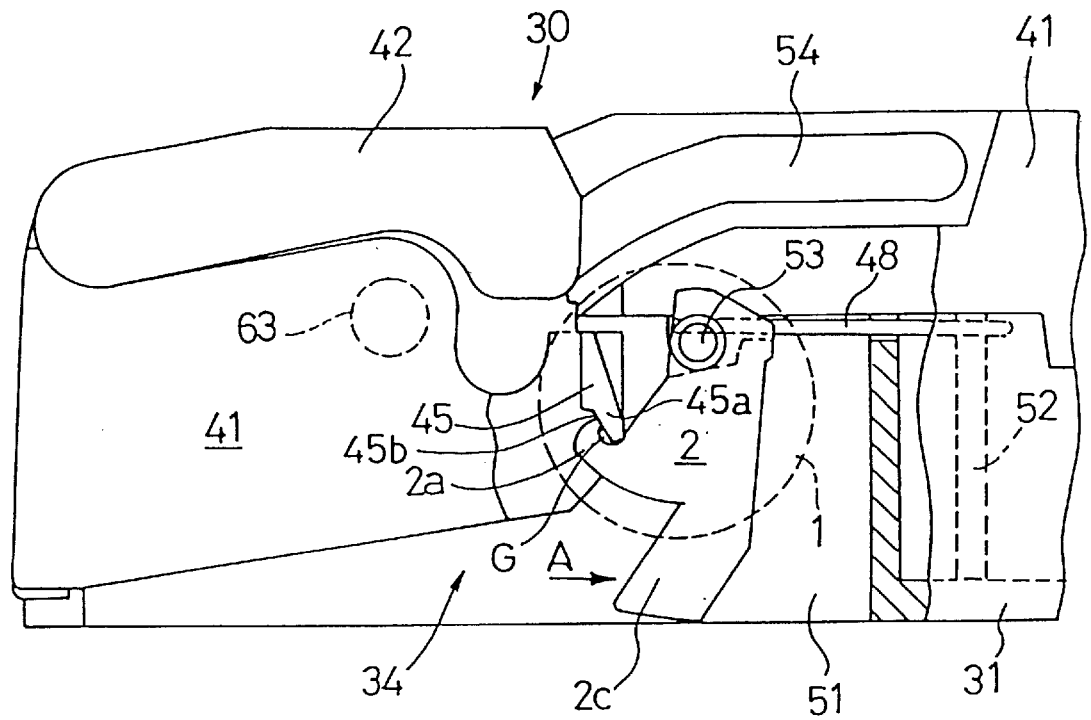
FIG. 1 is a side view, with parts cut away, showing the arrangement of a magnetic tape cassette according to the invention.
Figure 2:
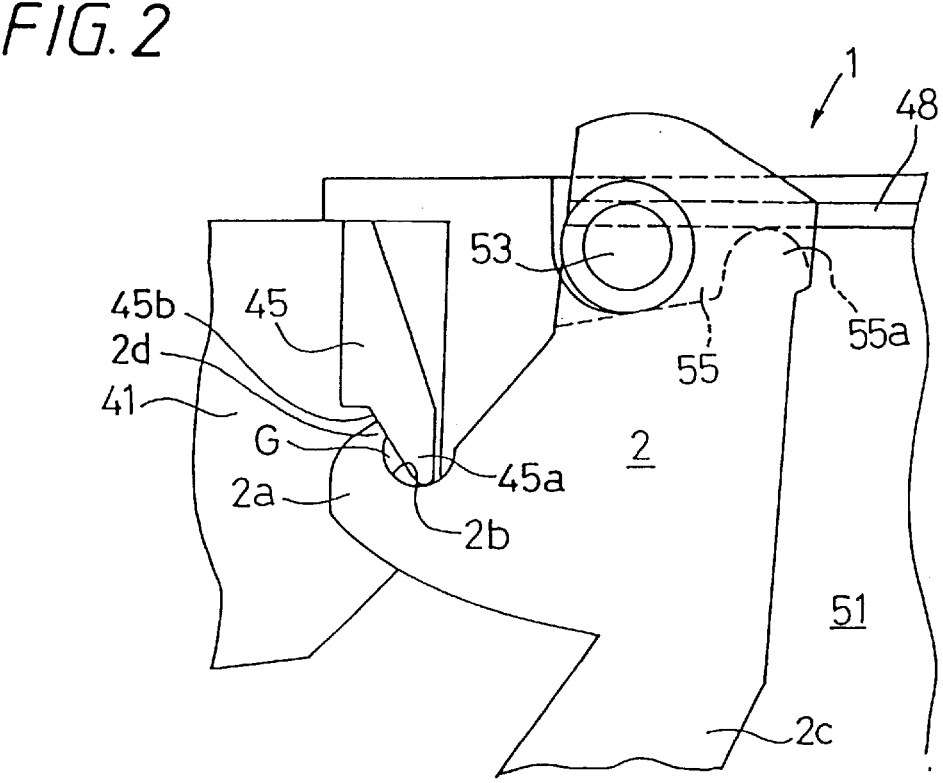
FIG. 2 is an enlarged side view showing essential components of a lock mechanism in the magnetic tape cassette of the invention.
Figure 3:
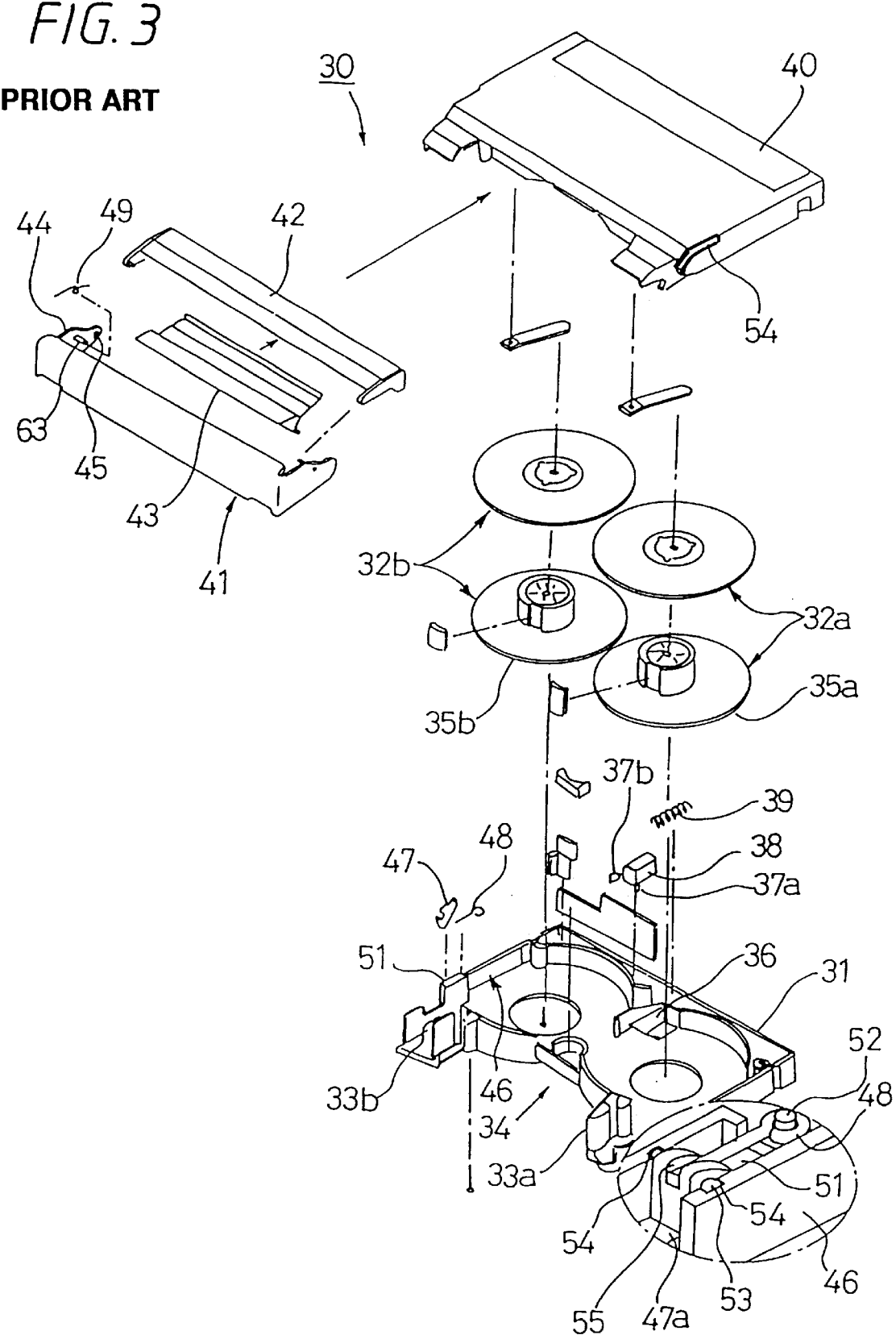
FIG. 3 is an exploded perspective view showing parts of an example of a conventional magnetic tape cassette.
Figure 4:
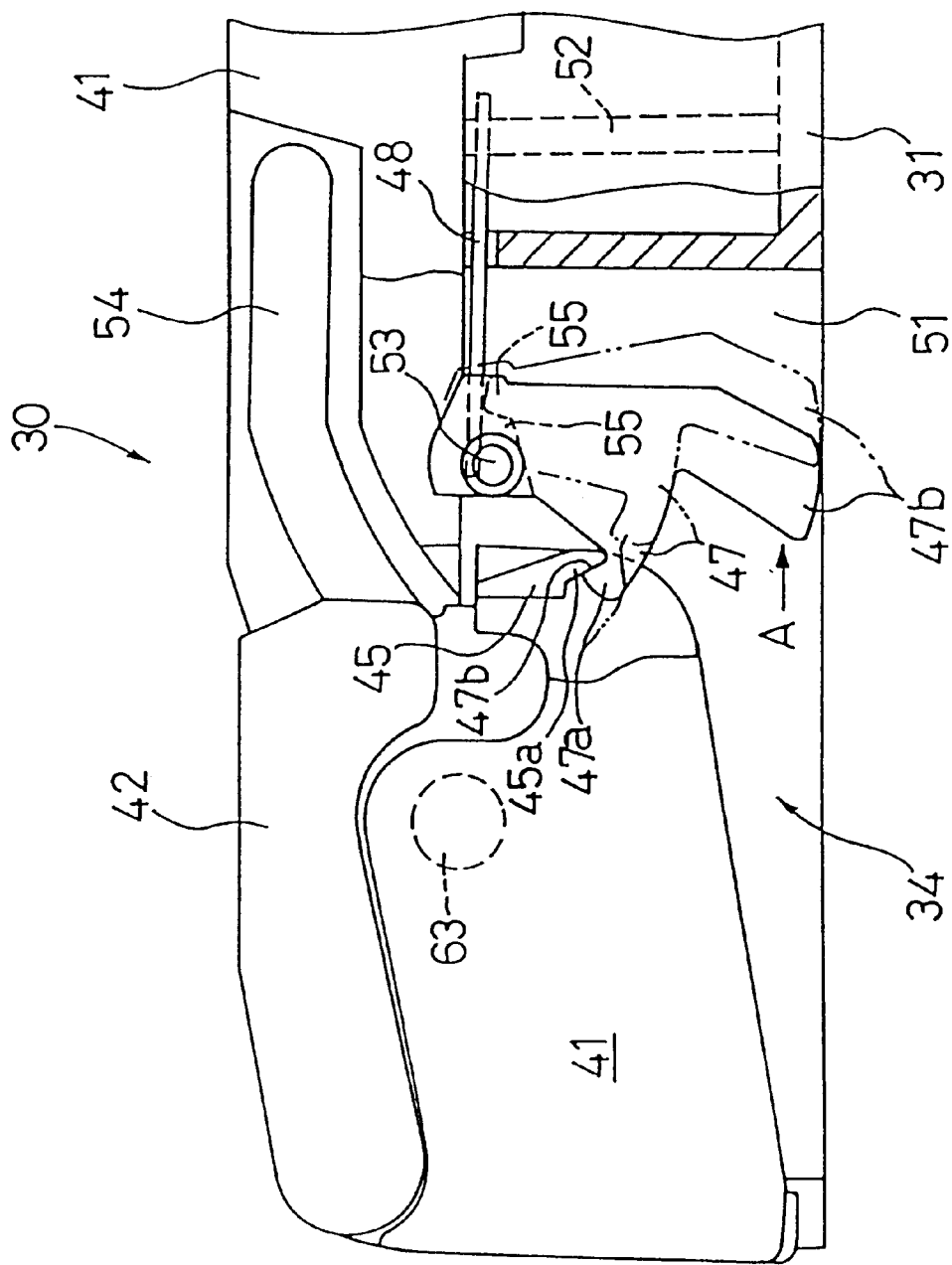
FIG. 4 is a side view, with parts cut away, showing a lock mechanism in the conventional magnetic tape cassette.

A magnetic tape cassette, which constitutes an embodiment of the invention, will be described with reference to FIGS. 1 and 2. FIG. 1 is a side view, with parts cut away, showing the arrangement of a lock mechanism in the magnetic tape cassette, and FIG. 2 is an enlarged side view of essential components of the lock mechanism. In FIGS. 1 and 2, parts corresponding functionally to those already described with reference to FIGS. 3 and 4 are therefore designated by the same reference numerals or characters.

In FIG. 1, reference numeral 1 designates the lock mechanism. The lock mechanism 1 comprises a lid lock having a novel configuration, a conventional outer lid 41, lid lock pawls formed on the inner surfaces of the side boards 44 of the latter 41, an accommodating section, and spring 48.

In a conventional lid lock 47, its hook 47a is extended in such a manner that the tip end 45b of the lid lock pawl 45 is kept brought in slide-contact with the side surface 47b of the hook 47a until reaching its locking position when the lid 41 is accidentally subjected to a force in the lid opening direction.

On the other hand, in this invention, the hook 21 of the lid lock 2 is curved; more specifically, its end portion 2d is abutted against the side surface 45b of the lid lock pawl 45 while forming a gap G with the end portion of the lid lock pawl 45. However, note that it is not always necessary to form the gap G.

As shown in an enlarged view of FIG. 2, the base portion of the hook 2a is an arcuate surface 2b; that is, the end portion of the lick lock pawl 45 is surrounded by the arcuate surface 2b. The end 45a of the lid lock 45 may form a minute gap with the arcuate surface 2b, or the former 45 may slightly touch the later 2b. The configuration of the locking groove 55 formed in the upper portion of the lid lock 2, the state of the locking of the spring 48, and the configuration of the shaft 53 are similar to those of the prior art.

With the above-described lock mechanism 1, the locking of the lid lock pawl 45, in other words, the locking of the outer lid 41 is achieved by the lid lock 2 which is abutted against the side surface of the lid lock pawl 45. The hook 2a of the lid lock 2 is abutted against the side surface which is relatively wide; that is, the part which is scarcely deformed. Accordingly, when the magnetic tape cassette is dropped, or is shocked, the force of shock is received by the side surface of the lid lock pawl 45 and the hook 2a abutted against the side surface; that is, the end portion of the lid lock pawl 45 is protected from being damaged.

With the magnetic tape cassette 30 with the above-described lock mechanism 1, in the case where it is not loaded in a video disk or the like, the lid lock 2 is urged clockwise, so that the hook is locked to the side surface of the lid rod pawl 45, and the outer lid 41 integral with the lid lock pawl 45 is not opened.

On the other hand, when the magnetic tape cassette 30 is loaded in a video deck or the like, a reacting section 2c is urged in the direction of the arrow A, so that the whole lid lock 2 is swung about the shaft 53 counterclockwise. That is, the lid lock 2 is swung from the position indicated by the solid line to the position indicated by the phantom line; that is, the lid lock pawl 45 is disengaged from the hook 2a of the lid lock 2.

As a result, the outer lid 41 is swung about the fulcrum pin 53 counterclockwise; that is, it is swung while pushing the upper lid 42, thus opening the front 34 of the magnetic tape cassette. Owing to the energization of the outer lid 41, the upper lid 42 is moved towards the rear end while being guided by the guide grooves 54 formed in both side surfaces of the upper half 40, so that the magnetic tape can be pulled out towards the front 34.

Now, the action occurring when an impact is applied to the magnetic tape cassette 30 will be described. In this case, the end of the hook 2a is moved while sliding on the side surface of the lid lock pawl 45 and being against the elastic force of the spring 48. On the other hand, the arcuate surface 2b is confronted with the end 45a of the lid lock pawl 45, and therefore even if the lid lock 2 is swung, the relation of confrontation between the two components is maintained unchanged. Accordingly, a unreasonably great force is scarcely applied to the end of the lid lock pawl 45, so that it is not deformed, not collapsed and not rolled up. That is, the opening of the outer lid 41 attributing to the deformation is positively prevented.

The aforementioned impact is absorbed by the wide side surface of the lid lock pawl 45, in other words, by the side surface high in mechanical strength and by the lid lock 2. Therefore, the end of the lid lock pawl 45 is prevented from being deformed and furthermore when an impact is applied to the magnetic tape cassette, the opening of the outer lid 41 is more positively prevented.

Furthermore, the base portion of the hook 2a is an arcuate surface 2b, and it may be or not in contact with the end of the lid lock pawl 45. Hence, in molding the lid lock 45, it is unnecessary to mold it with high accuracy; that it can be manufactured at low cost.

Industrial Applicability

While the embodiment of the invention has been described with respect to the DVC, the invention is not limited to the DVC. That is, the technical concept of the invention is also applicable to an ordinary VHS type magnetic tape cassette.

In the case where an impact is applied to the magnetic tape cassette for instance when the latter is dropped, the impact force is absorbed by the side surface of the lid lock pawl and the lid lock. Since the end portion of the lid lock pawl is confronted with the arcuate surface of the lid lock, no force is applied to the end portion thereof; that is, the latter is not deformed—not collapsed and not rolled up. Accordingly, the lid is prevented from unsatisfactorily closed. This means that the magnetic tape cassette is high in reliability.

The lid lock has the arcuate surface which confronts with the end of lid lock pawl i; that is, it is so designed that it is prevented from being deformed when an impact is applied to the magnetic tape cassette. Therefore, it is unnecessary to mold it with high accuracy; that is, the magnetic tape cassette can be manufactured with ease and at low cost.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape cassette comprising:

upper and lower half casings;

a pair of reels rotatably accommodated in said upper and lower half casings;

a magnetic tape wound on said pair of reels;

a lid which closes an opening formed in one end of said upper and lower half casings, and is opened when said magnetic tape is pulled out;

a lid lock pawl having an end, said lid lock pawl provided at one end of said lid; and a lid lock locked to said lid lock pawl and swingably mounted on one end of said upper and lower half casings, said lid lock including a curve-shaped hook, a tip end abutted against a side surface of said lid lock pawl, and a reacting section which is energized when said magnetic tape is pulled out, wherein said curve-shaped hook has an arcuate surface located at an inner basal portion of said hook, said arcuate surface is curved around said end of said lid lock pawl to form an escape gap between said side surface of said lid lock pawl and said arcuate surface of said lid lock, thereby preventing the end of said lid lock pawl from contacting a portion of said arcuate surface located immediately adjacent to said tip end of said hook, and wherein said lid lock is urged by an elastic element so that said hook is locked to the side surface of said lid lock pawl, and unlocked from said lid lock pawl by the energization of said reacting section.

2. The magnetic tape cassette according to claim 1, wherein the end of said lid lock pawl is disengaged from said arcuate surface of said lid lock when said tip end of said lid lock is engaged with the side surface of said lid lock pawl.

* * * * *